United States Patent
Shevade et al.

(10) Patent No.: US 11,470,047 B1
(45) Date of Patent: Oct. 11, 2022

(54) MANAGED VIRTUAL NETWORKS FOR COMPUTING CLOUD EDGE LOCATIONS

(71) Applicant: Amazon Technologies, Inc., Seattle, WA (US)

(72) Inventors: Upendra Bhalchandra Shevade, Washington, DC (US); Diwakar Gupta, Seattle, WA (US); Ishwardutt Parulkar, San Francisco, CA (US); Georgios Elissaios, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/699,306

(22) Filed: Nov. 29, 2019

(51) Int. Cl.
*G06F 15/00* (2006.01)
*H04L 9/40* (2022.01)
(Continued)

(52) U.S. Cl.
CPC ...... *H04L 63/0272* (2013.01); *H04L 12/4641* (2013.01); *H04L 41/0806* (2013.01);
(Continued)

(58) Field of Classification Search
CPC ............ H04L 63/0272; H04L 12/4641; H04L 41/0806; H04L 63/0263; H04L 67/10; H04L 67/306
See application file for complete search history.

(56) References Cited

U.S. PATENT DOCUMENTS

| 8,484,353 B1 * | 7/2013 | Johnson | H04L 47/70 |
| | | | 709/226 |
| 8,588,225 B1 * | 11/2013 | Ganesan | H04L 41/5054 |
| | | | 370/389 |

(Continued)

OTHER PUBLICATIONS

AT&T, "AT&T's Network and Microsoft's Cloud Deliver New Customer Offerings", available online at <https://about.att.com/story/2019/microsoft.html>, Jul. 17, 2019, 3 pages.

(Continued)

*Primary Examiner* — Cheikh T Ndiaye
(74) *Attorney, Agent, or Firm* — Nicholson De Vos Webster & Elliott LLP

(57) ABSTRACT

Techniques are described for a cloud provider to provide a managed experience related to the use of virtual networks and subnets to logically group user computing resources deployed at provider substrate extensions. A cloud provider enables users to create virtual network templates used when deploying computing resources at provider substrate extensions, where such virtual network templates may include various networking, security, and other configurations to be applied to network traffic and other activity of resources deployed within an associated virtual network. Once a virtual network template is defined, a user can use the template as the basis to launch resources into the virtual network and, by extension, into provider substrate extensions associated with the virtual network. Upon receiving such a request, the provider network can manage the creation and configuration of underlying subnets, route tables, and other resource, as needed, at each of the relevant provider substrate extensions.

21 Claims, 10 Drawing Sheets

(51) Int. Cl.
  *H04L 67/10* (2022.01)
  *H04L 41/0806* (2022.01)
  *H04L 67/306* (2022.01)
  *H04L 12/46* (2006.01)

(52) U.S. Cl.
  CPC .......... *H04L 63/0263* (2013.01); *H04L 67/10* (2013.01); *H04L 67/306* (2013.01)

(56) References Cited

U.S. PATENT DOCUMENTS

| | | | | |
|---|---|---|---|---|
| 9,306,949 | B1* | 4/2016 | Richard | H04L 63/0272 |
| 2016/0062746 | A1* | 3/2016 | Chiosi | G06F 8/35 |
| | | | | 717/104 |
| 2016/0080172 | A1* | 3/2016 | Uberoy | H04L 41/12 |
| | | | | 370/254 |
| 2019/0103990 | A1* | 4/2019 | Cidon | H04L 12/2854 |
| 2019/0104413 | A1* | 4/2019 | Cidon | H04L 41/12 |
| 2020/0244550 | A1* | 7/2020 | Maskalik | H04L 41/0806 |
| 2020/0275357 | A1* | 8/2020 | Bordeleau | H04W 48/18 |

OTHER PUBLICATIONS

Microsoft, "AT&T Integrating 5G with Microsoft Cloud to Enable Next-Generation Solutions on the Edge", available online at <https://news.microsoft.com/2019/11/26/att-integrating-5g-with-microsoft-cloud-to-enable-next-generation-solutions-on-the-edge/>, Microsoft News Center, Nov. 26, 2019, 6 pages.

Using VPC Networks, retrieved via Internet: https://web.archive.org/web/20190528010808/https://cloud.google.com/vpc/docs/using-vpc, accessed on May 3, 2022, 6 pages.

Virtual Private Cloud (VPC) network overview, retrieved via Internet: https://web.archive.org/web/20191116163113/https://cloud.google.com/vpc/docs/vpc, accessed on May 3, 2022, 7 pages.

\* cited by examiner

US 11,470,047 B1

MANAGED VIRTUAL NETWORKS FOR COMPUTING CLOUD EDGE LOCATIONS

BACKGROUND

Cloud computing platforms often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various embodiments in accordance with the present disclosure will be described with reference to the drawings, in which.

DETAILED DESCRIPTION

Figure 1:
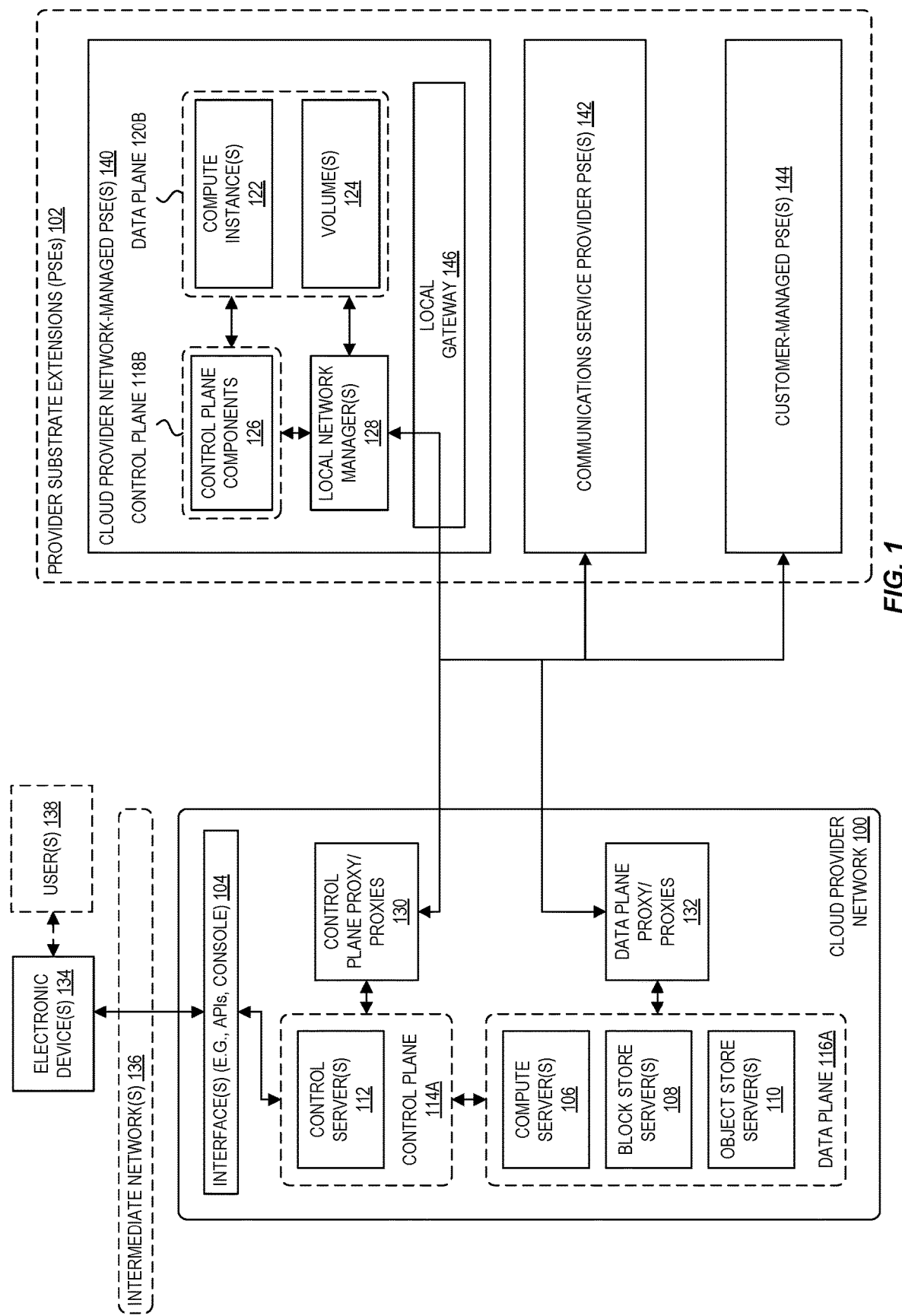
FIG. 1 illustrates an exemplary system including a cloud provider network and further including various provider substrate extensions of the cloud provider network according to some embodiments.

The present disclosure relates to methods, apparatus, systems, and non-transitory computer-readable storage media for enabling users to manage isolated virtual networks, or "virtual private clouds," of computing resources at a cloud provider network including provider substrate extensions. A virtual private cloud is a virtual network of computing resources within a cloud provider network that is logically isolated from other resources or virtual private clouds within the cloud provider network (e.g., other virtual private clouds associated with a same user and different users of the cloud provider network). According to embodiments described herein, users are able to define "virtual network templates" used by a cloud provider network to logically group user computing resources within networks that span one or more edge locations, referred to herein as provider substrate extensions. Users can define various settings in a virtual network template related to a corresponding virtual network such as, for example, routing configurations, security configurations, and the like, where such configurations are applied to network traffic and other activity generated by computing resources placed into the virtual network.

A cloud provider network, or "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to customer commands. Cloud computing can thus be considered as both the applications delivered as services over a publicly accessible network (e.g., the Internet, a cellular communication network) and the hardware and software in cloud provider data centers that provide those services. Some customers may desire to use the resources and services of such cloud provider networks, but for various reasons (e.g., latency in communications with customer devices, legal compliance, security, or other reasons) prefer for these resources and services to be provisioned within their own network (for example on premises of the customer), at a separate network managed by the cloud provider, within a network of a communications service provider, or within another independent network.

In some embodiments, segments of a cloud provider network—referred to herein as a "provider substrate extension" (PSE) or "edge location" (EL)—can be provisioned within a network that is separate from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" may be an extension of the cloud provider network substrate formed by one or more servers located on-premise in a customer or partner facility, in a separate cloud provider-managed facility, in a communications service provider facility, or in any other type of facility including servers where such server(s) communicate over a network (e.g., a publicly-accessible network such as the Internet) with a nearby availability zone or region of the cloud provider network. Customers may access a provider substrate extension via the cloud provider substrate or another network and may use the same application programming interfaces (APIs) to create and manage resources in the provider substrate extension as they would use to create and manage resources in the region of a cloud provider network.

As indicated above, one example type of provider substrate extension is one that is formed by servers located on-premise in a customer or partner facility. This type of substrate extension located outside of cloud provider network data centers can be referred to as an "outpost" of the cloud provider network. Another example type of provider substrate extension is one that is formed by servers located in a facility managed by the cloud provider but that includes data plane capacity controlled at least partly by a separate control plane of the cloud provider network.

In some embodiments, yet another example of a provider substrate extension is a network deployed within a communications service provider network. Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiber, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsiveness for existing cloud-based applications and to enable the next generation of applications for game streaming, virtual reality, real-time rendering, industrial automation, and autonomous vehicles.

As used herein, the computing resources of the cloud provider network installed within a communications service provider network (or possibly other networks) are sometimes also referred to as "cloud provider network edge locations" or simply "edge locations" in that they are closer to the "edge" where end users connect to a network than computing resources in a centralized data center. Such edge locations may include one or more networked computer systems that provide customers of the cloud provider network with computing resources to serve end users with lower latency than would otherwise be achievable if those compute instances were hosted in a data center site. A provider substrate extension deployed in a communication service provider network may also be referred to as a "wavelength zone."

FIG. 1 illustrates an exemplary system including a cloud provider network and further including various provider substrate extensions of the cloud provider network according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and preloaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., users 138) can connect to virtualized computing devices and other cloud provider network 100 resources and services using various interfaces 104 (e.g., APIs) via intermediate network(s) 136. An API refers to an interface and/or communication protocol between a client (e.g., an electronic device 134) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server 106, a block store server 108, an object store server 110, a control server 112) can have an IP address in the substrate network. Hardware virtualization technology can enable multiple operating systems to run concurrently on a host computer, for example as virtual machines (VMs) on a compute server 106. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

As illustrated, the traffic and operations of the cloud provider network substrate may broadly be subdivided into two categories in various embodiments: control plane traffic carried over a logical control plane 114A and data plane operations carried over a logical data plane 116A. While the data plane 116A represents the movement of user data through the distributed computing system, the control plane 114A represents the movement of control signals through the distributed computing system. The control plane 114A generally includes one or more control plane components or services distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 116A includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 100 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 116A can include one or more compute servers 106, which may be bare metal (e.g., single tenant) or may be virtualized by a hypervisor to run multiple VMs (sometimes referred to as "instances") or microVMs for one or more customers. These compute servers 106 can support a virtualized computing service (or "hardware virtualization service") of the cloud provider network. The virtualized computing service may be part of the control plane 114A, allowing customers to issue commands via an interface 104 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 116A can also include one or more block store servers 108, which can include persistent storage for storing volumes of customer data as well as software for managing these volumes. These block store servers 108 can support a managed block storage service of the cloud provider network. The managed block storage service may be part of the control plane 114A, allowing customers to issue commands via the interface 104 (e.g., an API) to create and manage volumes for their applications running on compute instances. The block store servers 108 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 116A can also include one or more object store servers 110, which represent another type of storage within the cloud provider network. The object store servers 110 include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 102 ("PSE") provides resources and services of the cloud provider network 100 within a separate network, thereby extending functionality of the cloud provider network 100 to new locations (e.g., for reasons related to latency in communications with customer devices, legal compliance, security, etc.). As indicated, such provider substrate extensions 102 can include cloud provider network-managed provider substrate extensions 140 (e.g., formed by servers located in a cloud provider-managed facility separate from those associated with the cloud provider network 100), communications service provider substrate extensions 142 (e.g., formed by servers associated with communications service provider facilities), customer-managed provider substrate extensions 144 (e.g., formed by servers located on-premise in a customer or partner facility), among other possible types of substrate extensions.

As illustrated in the example provider substrate extension 140, a provider substrate extension 102 can similarly include a logical separation between a control plane 118B and a data plane 120B, respectively extending the control plane 114A and data plane 116A of the cloud provider network 100. The provider substrate extension 102 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers can be provisioned by the cloud provider for deployment within a provider substrate extension 102. As described above, the cloud provider network 100 may offer a set of predefined instance types, each having varying types and quantities of underlying hardware resources. Each instance type may also be offered in various sizes. In order to enable customers to continue using the same instance types and sizes in a provider substrate extension 102 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 100 and the cloud provider network provider substrate extension.

As illustrated, the provider substrate extension servers can host one or more compute instances 122. Compute instances 122 can be VMs, or containers that package up code and all its dependencies so an application can run quickly and reliably across computing environments (e.g., including VMs). In addition, the servers may host one or more data volumes 124, if desired by the customer. In the region of a cloud provider network 100, such volumes may be hosted on dedicated block store servers. However, due to the possibility of having a significantly smaller capacity at a provider substrate extension 102 than in the region, an optimal utilization experience may not be provided if the provider substrate extension includes such dedicated block store servers. Accordingly, a block storage service may be virtualized in the provider substrate extension 102, such that one of the VMs runs the block store software and stores the data of a volume 124. Similar to the operation of a block storage service in the region of a cloud provider network 100, the volumes 124 within a provider substrate extension 102 may be replicated for durability and availability. The volumes may be provisioned within their own isolated virtual network within the provider substrate extension 102. The compute instances 122 and any volumes 124 collectively make up a data plane extension 120B of the provider network data plane 116A within the provider substrate extension 102.

The servers within a provider substrate extension 102 may, in some implementations, host certain local control plane components 126, for example, components that enable the provider substrate extension 102 to continue functioning if there is a break in the connection back to the cloud provider network 100. Examples of these components include a migration manager that can move compute instances 122 between provider substrate extension servers if needed to maintain availability, and a key value data store that indicates where volume replicas are located. However, generally the control plane 118B functionality for a provider substrate extension will remain in the cloud provider network 100 in order to allow customers to use as much resource capacity of the provider substrate extension as possible.

Server software running at a provider substrate extension 102 may be designed by the cloud provider to run on the cloud provider substrate network, and this software may be enabled to run unmodified in a provider substrate extension 102 by using local network manager(s) 128 to create a private replica of the substrate network within the edge location (a "shadow substrate"). The local network manager(s) 128 can run on provider substrate extension 102 servers and bridge the shadow substrate with the provider substrate extension 102 network, for example, by acting as a virtual private network (VPN) endpoint or endpoints between the provider substrate extension 102 and the proxies 130, 132 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 128 allow resources in the provider substrate extension 102 to seamlessly communicate with resources in the cloud provider network 100. In some implementations, a single local network manager can perform these actions for all servers hosting compute instances 122 in a provider substrate extension 102. In other implementations, each of the server hosting compute instances 122 may have a dedicated local network manager. In multi-rack edge locations, inter-rack communications can go through the local network managers, with local network managers maintaining open tunnels to one another.

Provider substrate extension locations can utilize secure networking tunnels through the provider substrate extension 102 network to the cloud provider network 100, for example, to maintain security of customer data when traversing the provider substrate extension 102 network and any other intermediate network (which may include the public internet). Within the cloud provider network 100, these tunnels are composed of virtual infrastructure components including isolated virtual networks (e.g., in the overlay network), control plane proxies 130, data plane proxies 132, and substrate network interfaces. Such proxies may be implemented as containers running on compute instances. In some embodiments, each server in a provider substrate extension 102 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some embodiments, a direct connection between a provider substrate extension 102 location and the cloud provider network 100 can be used for control and data plane communications. As compared to a VPN through other networks, the direct connection can provide constant bandwidth and more consistent network performance because of its relatively fixed and stable network path.

A control plane (CP) proxy 130 can be provisioned in the cloud provider network 100 to represent particular host(s) in an edge location. CP proxies are intermediaries between the control plane 114A in the cloud provider network 100 and control plane targets in the control plane 118B of provider substrate extension 102. That is, CP proxies 130 provide infrastructure for tunneling management API traffic destined for provider substrate extension servers out of the region substrate and to the provider substrate extension 102. For example, a virtualized computing service of the cloud provider network 100 can issue a command to a VMM of a server of a provider substrate extension 102 to launch a compute instance 122. A CP proxy maintains a tunnel (e.g., a VPN) to a local network manager 128 of the provider substrate extension. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies may be instantiated one-for-one with servers at a provider substrate extension 102 or may be able to manage control plane traffic for multiple servers in the same provider substrate extension.

A data plane (DP) proxy 132 can also be provisioned in the cloud provider network 100 to represent particular server(s) in a provider substrate extension 102. The DP proxy 132 acts as a shadow or anchor of the server(s) and can be used by services within the cloud provider network 100 to monitor health of the host (including its availability, used/free compute and capacity, used/free storage and capacity, and network bandwidth usage/availability). The DP proxy 132 also allows isolated virtual networks to span provider substrate extensions 102 and the cloud provider network 100 by acting as a proxy for server(s) in the cloud provider network 100. Each DP proxy 132 can be implemented as a packet-forwarding compute instance or container. As illustrated, each DP proxy 132 can maintain a VPN tunnel with a local network manager 128 that manages traffic to the server(s) that the DP proxy 132 represents. This tunnel can be used to send data plane traffic between the provider substrate extension server(s) and the cloud provider network 100. Data plane traffic flowing between a provider substrate extension 102 and the cloud provider network 100 can be passed through DP proxies 132 associated with that provider substrate extension. For data plane traffic flowing from a provider substrate extension 102 to the cloud provider network 100, DP proxies 132 can receive encapsulated data plane traffic, validate it for correctness, and allow it to enter into the cloud provider network 100. DP proxies 132 can forward encapsulated traffic from the cloud provider network 100 directly to a provider substrate extension 102.

Local network manager(s) 128 can provide secure network connectivity with the proxies 130, 132 established in the cloud provider network 100. After connectivity has been established between the local network manager(s) 128 and the proxies, customers may issue commands via the interface 104 to instantiate compute instances (and/or perform other operations using compute instances) using provider substrate extension resources in a manner analogous to the way in which such commands would be issued with respect to compute instances hosted within the cloud provider network 100. From the perspective of the customer, the customer can now seamlessly use local resources within a provider substrate extension (as well as resources located in the cloud provider network 100, if desired). The compute instances set up on a server at a provider substrate extension 102 may communicate both with electronic devices located in the same network as well as with other resources that are set up in the cloud provider network 100, as desired. A local gateway 146 can be implemented to provide network connectivity between a provider substrate extension 102 and a network associated with the extension (e.g., a communications service provider network in the example of a provider substrate extension 142).

There may be circumstances that necessitate the transfer of data between the object storage service and a provider substrate extension 102. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE to minimize the impact of PSE-region latency on the customer's workloads. The object gateway can also temporarily store snapshot data from snapshots of volumes in the PSE and then sync with the object servers in the region when possible. The object gateway can also store machine images that the customer designates for use within the PSE or on the customer's premises. In some implementations, the data within the PSE may be encrypted with a unique key, and the cloud provider can limit keys from being shared from the region to the PSE for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot and machine image data using the PSE encryption key.

In the manner described above, a PSE 102 forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A near zone may be connected in various ways to a publicly accessible network such as the Internet, for example directly, via another network, or via a private connection to a region. Although typically a near zone would have more limited capacity than a region, in some cases a near zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Figure 2:
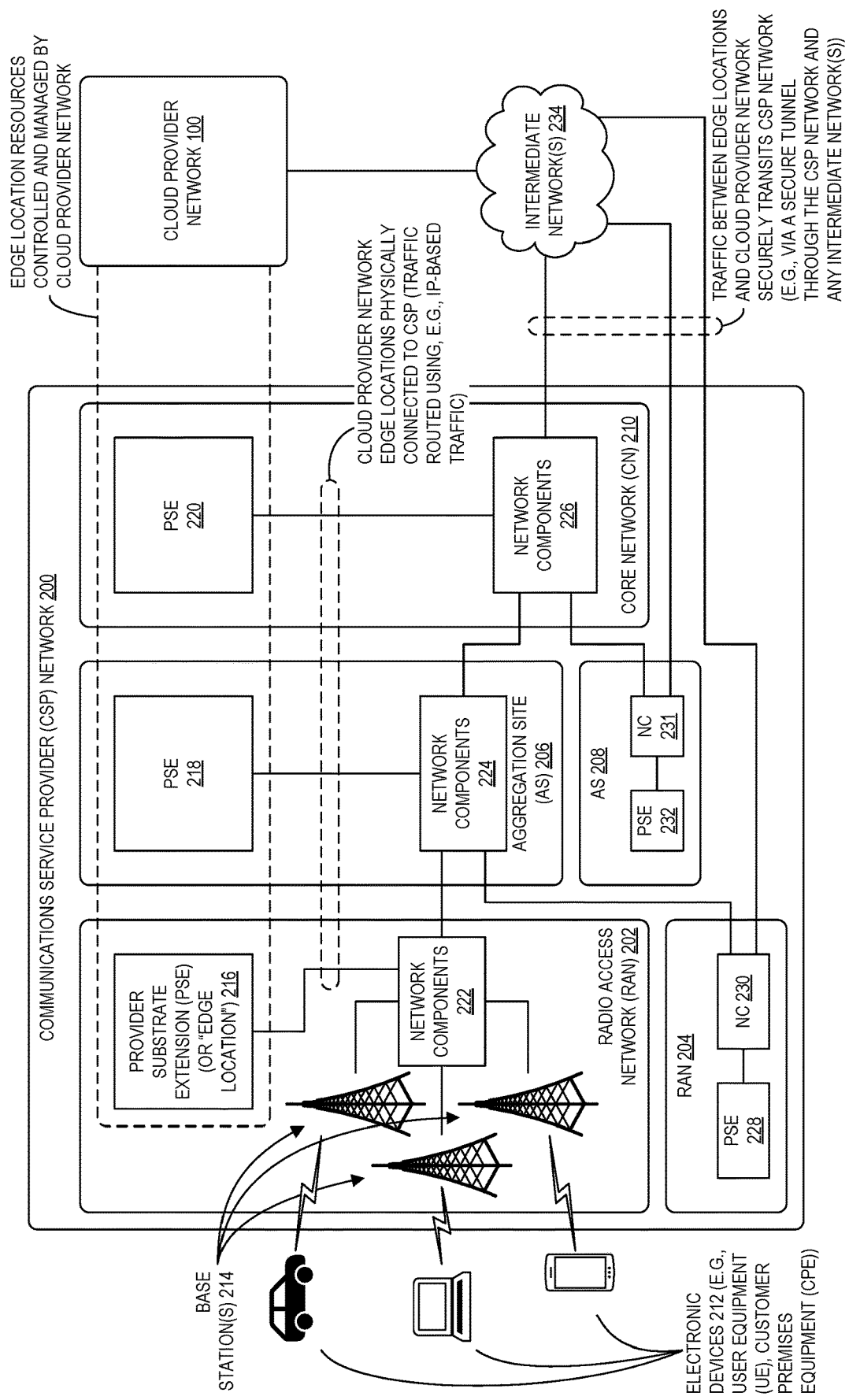
FIG. 2 illustrates an exemplary system in which cloud provider network substrate extensions are deployed within a communications service provider network according to some embodiments.

FIG. 2 illustrates an exemplary system in which cloud provider network edge locations are deployed within a communications service provider network according to some embodiments. A communications service provider (CSP) network 200 generally includes a downstream interface to end user electronic devices and an upstream interface to other networks (e.g., the internet). In this example, the CSP network 200 is a wireless "cellular" CSP network that includes radio access networks (RAN) 202, 204, aggregation sites (AS) 206, 208, and a core network (CN) 210. The RANs 202, 204 include base stations (e.g., NodeBs, eNodeBs, gNodeBs) that provide wireless connectivity to electronic devices 212. The core network 210 typically includes functionality related to the management of the CSP network (e.g., billing, mobility management, etc.) and transport functionality to relay traffic between the CSP network and other networks. Aggregation sites 206, 208 can serve to consolidate traffic from many different radio access networks to the core network and to direct traffic originating from the core network to the various radio access networks.

From left to right in FIG. 2, end user electronic devices 212 wirelessly connect to base stations (or radio base stations) 214 of a radio access network 202. Such electronic devices 212 are sometimes referred to as user equipment (UE) or customer premises equipment (CPE). Data traffic is often routed through a fiber transport network consisting of multiple hops of layer 3 routers (e.g., at aggregation sites) to the core network 210. The core network 210 is typically housed in one or more data centers. For data traffic destined for locations outside of the CSP network 200, the network components 222-226 typically include a firewall through which traffic can enter or leave the CSP network 200 to external networks such as the internet or a cloud provider network 100. Note that in some embodiments, the CSP network 200 can include facilities to permit traffic to enter or leave from sites further downstream from the core network 210 (e.g., at an aggregation site or RAN).

Provider substrate extensions 216-220 include computing resources managed as part of a cloud provider network but installed or sited within various points of a CSP network (e.g., on premise in a CSP owned or leased space). The computing resources typically provide some amount of compute and memory capacity that the cloud provider can allocate for use by its customers. The computing resources can further include storage and accelerator capacity (e.g., solid-state drives, graphics accelerators, etc.). Here, provider substrate extensions 216, 218, and 220 are in communication with a cloud provider network 100.

Typically, the further—e.g., in terms of network hops and/or distance—a provider substrate extension is from the cloud provider network 100 (or closer to electronic devices 212), the lower the network latency is between computing resources within the provider substrate extension and the electronic devices 212. However, physical site constraints often limit the amount of provider substrate extension location computing capacity that can be installed at various points within the CSP or determine whether computing capacity can be installed at various points at all. For example, a provider substrate extension sited within the core network 210 can typically have a much larger footprint (in terms of physical space, power requirements, cooling requirements, etc.) than a provider substrate extension sited within the RAN 202, 204.

The installation or siting of provider substrate extensions within a CSP network can vary subject to the particular network topology or architecture of the CSP network. As indicated in FIG. 2, provider substrate extensions can generally be connected anywhere the CSP network can break out packet-based traffic (e.g., IP based traffic). Additionally, communications between a given provider substrate extension and the cloud provider network 100 typically securely transit at least a portion of the CSP network 200 (e.g., via a secure tunnel, virtual private network, a direct connection, etc.). In the illustrated example, the network components 222 facilitate the routing of data traffic to and from a provider substrate extension 216 integrated with the RAN 202, the network components 224 facilitate the routing of data traffic to and from an provider substrate extension 218 integrated with the AS 206, and the network components 226 facilitate the routing of data traffic to and from a provider substrate extension 220 integrated with the CN 210. Network components 222-226 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some embodiments, traffic between a provider substrate extension 228 and the cloud provider network 100 can be broken out of the CSP network 200 without routing through the core network 210. For example, network components 230 of a RAN 204 can be configured to route traffic between a provider substrate extension 216 of the RAN 204 and the cloud provider network 100 without traversing an aggregation site or core network 210. As another example, network components 231 of an aggregation site 208 can be configured to route traffic between a provider substrate extension 232 of the aggregation site 208 and the cloud provider network 100 without traversing the core network 210. The network components 230, 231 can include a gateway or router having route data to direct traffic from the edge location destined for the cloud provider network 100 to the cloud provider network 100 (e.g., through a direct connection or an intermediate network 234) and to direct traffic from the cloud provider network 100 destined for the provider substrate extension to the provider substrate extension.

In some embodiments, provider substrate extensions can be connected to more than one CSP network. For example, when two CSPs share or route traffic through a common point, a provider substrate extension can be connected to both CSP networks. For example, each CSP can assign some portion of its network address space to the provider substrate extension, and the provider substrate extension can include a router or gateway that can distinguish traffic exchanged with each of the CSP networks. For example, traffic destined for the provider substrate extension from one CSP network might have a different destination IP address, source IP address, and/or virtual local area network (VLAN) tag than traffic received from another CSP network. Traffic originating from the provider substrate extension to a destination on one of the CSP networks can be similarly encapsulated to have the appropriate VLAN tag, source IP address (e.g., from the pool allocated to the provider substrate extension from the destination CSP network address space) and destination IP address.

Note that while the exemplary CSP network architecture of FIG. 2 includes radio access networks, aggregation sites, and a core network, the architecture of a CSP network can vary in naming and structure across generations of wireless technology, between different CSPs, as well as between wireless and fixed-line CSP networks. Additionally, while FIG. 2 illustrates several locations where an edge location can be sited within a CSP network, other locations are possible (e.g., at a base station).

Figure 3:
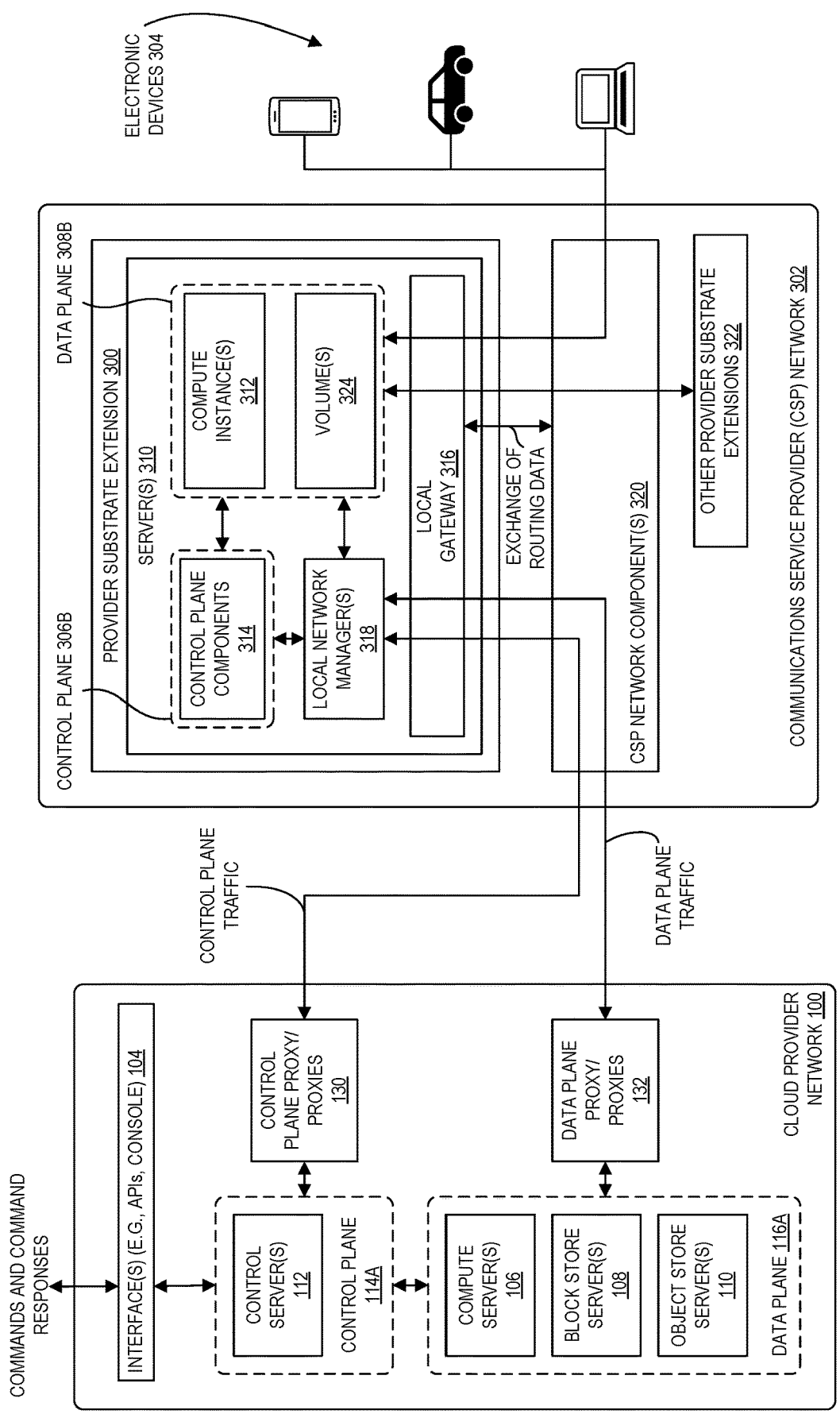
FIG. 3 illustrates in greater detail exemplary components of and connectivity between a cloud provider network and a provider substrate extension within a communications service provider network according to some embodiments.

FIG. 3 illustrates in greater detail exemplary components of and connectivity between a cloud provider network and a provider substrate extension within a communications service provider network according to some embodiments. A provider substrate extension 300 provides resources and services of the cloud provider network within a CSP network 302 thereby extending functionality of the cloud provider network 100 to be closer to end user devices 304 connected to the CSP network.

The provider substrate extension 300 similarly includes a logical separation between a control plane 306B and a data plane 308B, respectively extending the control plane 114A and data plane 116A of the cloud provider network 100. The provider substrate extension 300 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers 310 can be provisioned by the cloud provider for deployment within the CSP network 302.

The servers 310 within a provider substrate extension 300 may, in some implementations, host certain local control plane components 314, for example, components that enable the provider substrate extension 300 to continue functioning if there is a break in the connection back to the cloud provider network 100. Further, certain controller functions may typically be implemented locally on data plane servers, even in the cloud provider datacenters—for example a function for collecting metrics for monitoring instance health and sending them to a monitoring service, and a function for coordinating transfer of instance state data during live migration. However, generally the control plane 306B functionality for a provider substrate extension 300 will remain in the cloud provider network 100 in order to allow customers to use as much resource capacity of the provider substrate extension as possible.

As illustrated, the provider substrate extension servers 310 can host compute instances 312. Compute instances can be VMs, microVMs, or containers that package up code and all its dependencies so an application can run quickly and reliably across computing environments (e.g., including VMs). Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In some embodiments, the execution of edge-optimized compute instances is supported by a lightweight virtual machine manager (VMM) running on the servers 310 upon which edge-optimized compute instances are launched based on application profiles. These VMMs enable the launch of lightweight micro-virtual machines (microVMs) in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In addition, the servers 310 may host one or more data volumes 324, if desired by the customer. The volumes may be provisioned within their own isolated virtual network within the provider substrate extension 300. The compute instances 312 and any volumes 324 collectively make up a data plane extension 308B of the provider network data plane 116A within the provider substrate extension 300.

A local gateway 316 can be implemented to provide network connectivity between the provider substrate extension 300 and the CSP network 302. The cloud provider can configure the local gateway 316 with an IP address on the CSP network 302 and to exchange routing data (e.g., via the Border Gateway Protocol (BGP)) with the CSP network components 320. The local gateway 316 can include one or more route tables that control the routing of inbound traffic to the provider substrate extension 300 and outbound traffic leaving the provider substrate extension 300. The local gateway 316 can also support multiple VLANs in cases where the CSP network 302 uses separate VLANs for different portions of the CSP network 302 (e.g., one VLAN tag for the wireless network and another VLAN tag for a fixed network).

In some embodiments of a provider substrate extension 300, the extension includes one or more switches, sometimes referred to top of rack (TOR) switches (e.g., in rack-based embodiments). The TOR switches are connected to CSP network routers (e.g., CSP network components 320), such as Provider Edge (PE) or Software Defined Wide Area Network (SD-WAN) routers. Each TOR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows an edge location management entity of the control plane of the cloud provider network 100 to add more peering links to an edge location without adjustments to routing. Each of the TOR switches can establish eBGP sessions with the carrier PE or SD-WAN routers. The CSP can provide a private Autonomous System Number (ASN) for the edge location and an ASN of the CSP network 302 to facilitate the exchange of routing data.

Data plane traffic originating from the provider substrate extension 300 can have a number of different destinations. For example, traffic addressed to a destination in the data plane 116A of the cloud provider network 100 can be routed via the data plane connection between the provider substrate extension 300 and the cloud provider network 100. The local network manager 318 can receive a packet from a compute instance 312 addressed to, for example, another compute instance in the cloud provider network 100 and encapsulate the packet with a destination as the substrate IP address of the server hosting the other compute instance before sending it to the cloud provider network 100 (e.g., via a direct connection or tunnel). For traffic from a compute instance 312 addressed to another compute instance hosted in another provider substrate extension 322, the local network manager 318 can encapsulate the packet with a destination as the IP address assigned to the other provider substrate extension 322, thereby allowing the CSP network components 320 to handle the routing of the packet. Alternatively, if the CSP network components 320 do not support inter-edge location traffic, the local network manager 318 can address the packet to a relay in the cloud provider network 100 that can send the packet to the other provider substrate extension 322 via its data plane connection (not shown) to the cloud provider network 100. Similarly, for traffic from a compute instance 312 address to a location outside of the CSP network 302 or the cloud provider network 100 (e.g., on the internet), if the CSP network components 320 permit routing to the internet, the local network manager 318 can encapsulate the packet with a source IP address corresponding to the IP address in the carrier address space assigned to the compute instance 312. Otherwise, the local network manager 318 can send the packet to an Internet Gateway in the cloud provider network 100 that can provide internet connectivity for the compute instance 312. For traffic from a compute instance 312 addressed to an electronic device 304, the local gateway 316 can use Network Address Translation (NAT) to change the source IP address of the packet from an address in an address space of the cloud provider network to an address space of the carrier network.

The local gateway 316, local network manager(s) 318, and other local control plane components 314 may run on the same servers 310 that host compute instances 312, may run on a dedicated processor (e.g., on an offload card) integrated with edge location servers 310, or can be executed by servers separate from those that host customer resources.

Figure 4:
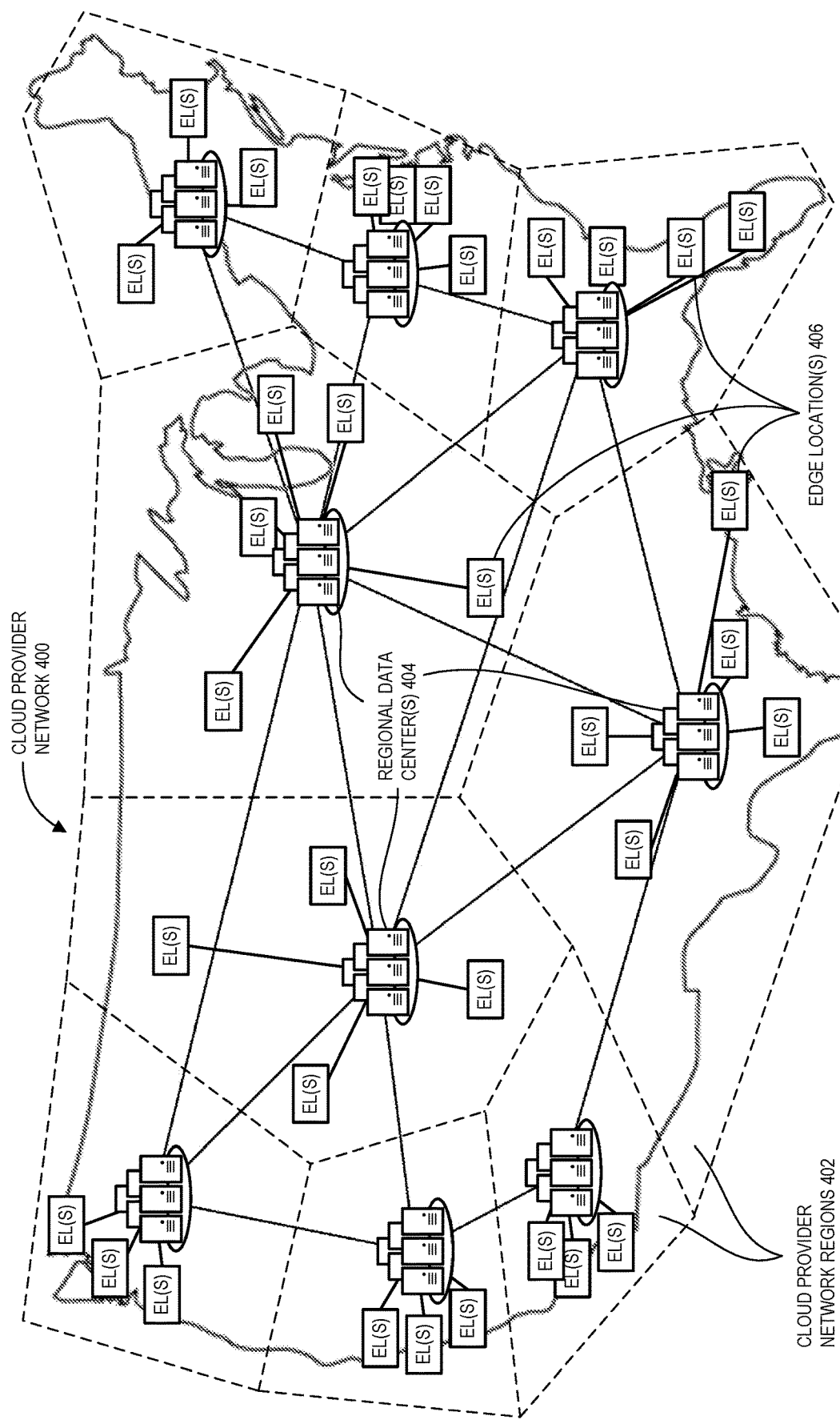
FIG. 4 illustrates an exemplary cloud provider network including geographically dispersed provider substrate extensions (or "edge locations") according to some embodiments.

FIG. 4 illustrates an exemplary cloud provider network including geographically dispersed provider substrate extensions (or "edge locations") according to some embodiments. As illustrated, a cloud provider network 400 can be formed as a number of regions 402, where a region is a separate geographical area in which the cloud provider has one or more data centers 404. Each region 402 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations 406 can be much higher. Such widespread deployment of edge locations 406 can provide low-latency connectivity to the cloud for a much larger group of end user devices (in comparison to those that happen to be very close to a regional data center). In some embodiments, each edge location 406 can be peered to some portion of the cloud provider network 400 (e.g., a parent availability zone or regional data center). Such peering allows the various components operating in the cloud provider network 400 to manage the compute resources of the edge location. In some cases, multiple edge locations may be sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

An edge location 406 can be structured in several ways. In some implementations, an edge location 406 can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers, instead of the edge location infrastructure described herein.

According to embodiments described herein, a cloud provider provides a managed experience related to the use of virtual networks and subnets used to logically group user computing resources deployed at provider substrate extensions. In some embodiments, a cloud provider enables users to create and configure virtual network templates that can be used when deploying computing resources at provider substrate extensions, where such virtual network templates may include various networking, security, and other configurations to be applied to network traffic and other activity of resources deployed within an associated virtual network. Once a virtual network template is defined, a user can use the template as the basis to launch resources into the virtual network and, by extension, into provider substrate extensions associated with the virtual network. Upon receiving such a request, the provider network can automatically manage the creation and configuration of underlying subnets, route tables, and other resources, as needed, at each of the relevant provider substrate extensions. The use of such templates enables users to readily deploy resources at provider substrate extensions without the need to manually configure such virtual networking details at each provider extension location, which may be numerous and otherwise cumbersome to manage.

Cloud providers have traditionally enabled users to manage computing resources in the context of virtual private clouds, also referred to herein as virtual networks. In some embodiments, a virtual network is unit of network organization defined by a user of a cloud provider for computing resources deployed by the user. A virtual network is typically associated a user account of the cloud provider and is capable of including computing resources spanning a defined region of the cloud provider. From a networking perspective, a virtual network includes a collection of one or more non-overlapping private IPv4 and/or IPv6 address ranges. A virtual network is further a regional container of other types of networking-related objects such as, for example, subnets, security groups, route tables, network access control lists (NACLs), etc. From an infrastructure perspective, virtual networks define a network isolation boundary. For example, packets originating in one virtual network typically are not permitted to reach a network destination outside of that virtual network unless a user associated with the virtual network has explicitly allowed the packets to travel as such.

As indicated elsewhere herein, a cloud provider network typically includes a number of regions and each region can include one or more availability zones, where availability zones generally represent distinct locations engineered to be isolated from failures in other availability zones. In some embodiments, virtual networks are configured to span all the availability zones in a region with which the virtual network is associated. After creating a virtual network, users can add one or more subnets in one or more availability zones within the associated region. In some embodiments, the creation of a subnet includes specification of a classless inter-domain routing (CIDR) block for the subnet, which is a subset of the CIDR block of the associated virtual network. In some implementations, each subnet resides entirely within one availability zone and cannot span multiple zones. By launching instances in separate availability zones, for example, users can protect their applications from the failure of a single location. In some embodiments, virtual network interfaces are launched inside subnets, where each virtual network interface is assigned one or more addresses from the subnet range and can be associated with a compute instance (thus placing the compute instance into the subnet).

In some embodiments, users can configure a route table to be associated with a subnet. At a high level, a route table defines where the traffic exiting a subnet can go (and thus may sometimes be referred to as a forwarding table). In some embodiments, a subnet is associated with only one route table, but a route table can be associated with many subnets. In some embodiments, the routing of traffic based on route tables is managed by a virtual router—sometimes referred to as a "phantom" router—associated with a subnet. For example, if the destination address of a packet is a destination in the same subnet, the packet is sent directly to that destination. If the destination address is instead not a destination in the same subnet, the packet goes to the virtual router, which uses the associated route table for the subnet to identify a next hop for a destination address using the route table entries. The next hop, for example, can be a virtual network interface/IP address, various virtual network gateways, another virtual network, endpoint devices, etc.

In some embodiments, users can further configure and associate security groups with a virtual network. Security group rules determine which packets traversing the virtual network are allowed to reach a destination address and which packets are dropped. In some embodiments, a security group is defined by a set of ingress/egress allow rules, where the default policy is to deny. Security groups, for example, can be used to group together instances having a same role and/or security posture. For example, a user might create a first security group for database servers and a second security group for web servers deployed within a user's virtual network. An interface associated with an instance in a virtual network can have one or more associated security groups, and interfaces from different subnets can have the same security group. From an infrastructure perspective, security groups may be implemented as stateful firewall rules at both the source and destination interfaces.

As indicated above, in some embodiments, instances within a virtual network can be associated with virtual network interfaces. Virtual network interfaces are the virtual network analogue of physical network interfaces and are attached to a single compute instance at any given time. Virtual network interfaces belong to a subnet and are hence generally associated with a particular user account of the cloud provider network.

In some embodiments, virtual networks can include various types of gateways, where such gateways represent a named object that enables connectivity to other networks. For example, one type of virtual network gateway might enable connectivity to the public internet, another type of gateway might represent a network address translation (NAT) gateway to the Internet, another type might represent a virtual gateway to another virtual network, and so forth. In some embodiments, virtual networks associated with provider substrate extensions may also include a gateway that represents connectivity to private communications service provider networks.

As indicated above, cloud provider networks have traditionally enabled users to manage computing resources in terms of isolated virtual networks. Within such isolated virtual networks, customers typically define and use subnets to enable communication between the components of their application within their virtual network. However, the extension of a cloud provider to hundreds or more provider substrate extensions, and thus the possible corresponding creation of hundreds of subnets for a widely deployed application, presents a number of challenges for users attempting to manage such virtual networks. The manual configuration of such virtual network details may further provide customers with low-level visibility into infrastructure details that a cloud provider might prefer to abstract from the user (e.g., details related to the total number of provider substrate extension locations, their exact locations, etc.).

According to embodiments described herein, a cloud provider automates various aspects of managing users' virtual networks relative to provider substrate extensions. As indicated, in some embodiments, a cloud provider network enables users to create virtual network templates used to define various routing, security, and other configurations to be associated with virtual networks used to group computing resources to be deployed at one or more provider substrate extensions. Based on such templates, a cloud provider automatically manages the creation and configuration of subnets and other related resources relative to relevant provider substrate extensions (e.g., including the configuration of route tables, security groups, etc.) and the launch of compute instances and other resources into the virtual networks and underlying infrastructure.

In some embodiments, users can further define application profiles (e.g., stored as application profile(s) 608) that include parameters related to execution of user workloads at provider substrate extensions (e.g., including desired amounts of computing resources to be devoted to instances launched based on a profile, desired latency within specific geographic areas for launched instances, instance placement and scaling configurations, etc.). In this manner, rather launching compute instances into specified subnets created and managed by a user, users can instead launch instances of a workload based on a defined application profile and virtual network template while the cloud provider network manages the creation of virtual network resources and the selection of specific provider substrate extensions satisfying the user's specified configurations.

A cloud provider may provide a managed networking experience in any of several ways. In some embodiments, a managed networking experience includes the use of cloud provider-defined "edge zones" to manage the deployment of computing resources at provider substrate extensions. A cloud provider, for example, may define "edge zones" such that each zone encompasses multiple provider substrate extension sites and which, for example, might typically correspond to a populated geographical area (e.g. a metro area such as Seattle, the San Francisco Bay Area, etc.). These edge zones can thus be used to abstract an actual location of constituent provider substrate extensions (e.g., multiple sites associated with communications service provider facilities, or sites associated with other types of provider substrate extensions) and provide a higher-level abstraction that users can use to deploy resources at provider substrate extensions.

In some embodiments, users of a cloud provider network are able to directly configure a type of logical subnet associated with such edge zones, referred to herein as an edge subnet or edge network. From the perspective of a user, an edge subnet or edge network represents a single subnet. The cloud provider network may then create and manage one or more underlying subnets associated with one or more respective provider substrate extension locations. The management of these subnets, for example, can include configuring how the subnets are mapped to particular provider substrate extension locations, how the addresses within each location are allocated, and the like. In this example, customers can perform actions relative to edge subnets that may be analogous to actions that can be performed with respect to traditional subnets within a cloud provider network such as, for example, configuring route tables, security groups, and the like. The cloud provider then automatically configures corresponding resources (e.g., one or more corresponding route tables, security groups) relative to each of the actual underlying subnets at the provider substrate extensions.

Figure 5:
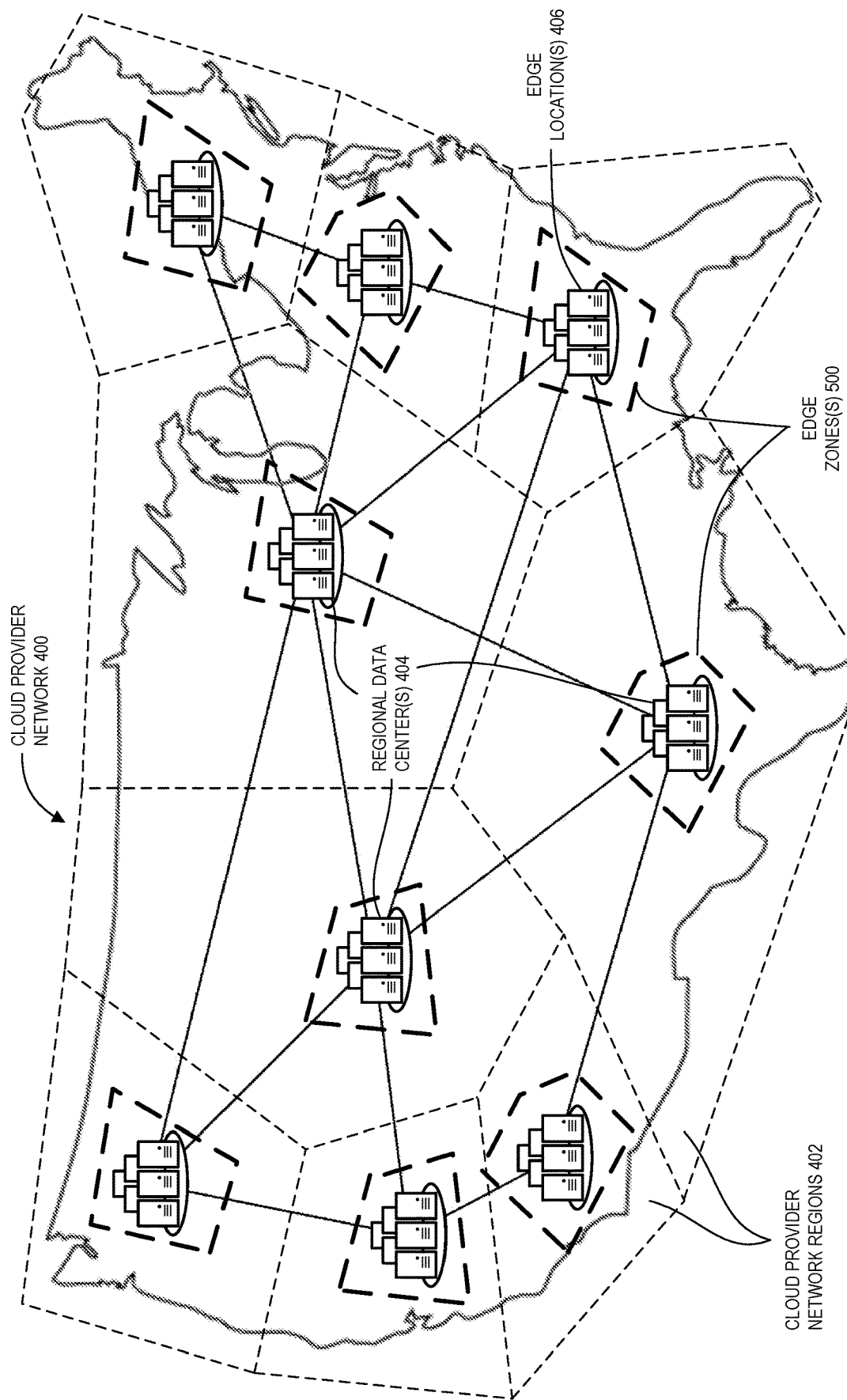
FIG. 5 illustrates an exemplary cloud provider network including edge zones used to group geographically dispersed provider substrate extensions according to some embodiments.

FIG. 5 illustrates an exemplary cloud provider network include edge zones used to group geographically dispersed provider substrate extensions according to some embodiments. As illustrated, FIG. 5 includes a map of the United States overlaid with nine example edge zones (e.g., each corresponding to a population center within the United States). In some embodiments, each edge zone (e.g., edge zones 500) is "parented" to a corresponding region 402 of the provider network. In some embodiments, edge zones may or may not be further subdivided into additional availability zones. In some embodiments, provider substrate extensions corresponding to a particular edge zone may be parented to the same availability zone or to availability zones in the same region. In some embodiments, using such edge zones, users can create a logical subnet for an entire edge zone and cloud provider can map that logical subnet to physical subnets at corresponding edge locations.

In some embodiments, users can launch resources into an edge zone (e.g., for placement at any satisfactory provider substrate extension within the edge zone), or can target the launch of resources into specific provider substrate extension locations within an edge zone by creating an edge placement group. The following is an example request to create an edge placement group for an edge zone, the request indicating that resources are to be launched into provider substrate extension locations satisfying specified criteria:

csp psec create-placement-group
--region west-2
--edge-zone-ids west-2-edge-1
--edge-location-names 'Seattle, WA'
--client-round-trip-time-ms 10
--csp-names {cspl}
--placement-name my_edge_zone_group The example request above, for example, results in the creation of a placement group in the west-2-edge-1 edge zone with the placement constraint that instances launched in that group are to be within 10 milliseconds from Seattle, Wash. In this manner, placement groups can be used to guide the placement of instances launched into the group at various provider substrate extension(s) within an edge zone.

In some embodiments, users can request the creation of a subnet to be associated with an edge zone that is part of a virtual network. As illustrated, similar to Internet-routable, auto-assigned IP addresses, users can choose to auto-assign communication service provider IP addresses to their instances:

csp psec create-subnet
--region west-2
--vpc-id my_vpc
--cidr-block 10.0.0.0/24
--edge-zone-id west-2-edge-1
[--auto-assign-csp-ip-address]
returns subnet-id In some embodiments, a subnet created in this manner spans all provider substrate extensions that are members of the specified edge zone. The subnet identifier can then be used in cloud provider APIs that accept subnet identifiers, including APIs used to launch instances.

At indicated, in some embodiments, a cloud provider provides a managed virtual network experience in which users define "virtual network templates" used by the cloud provider to automatically manage the creation of underlying resources of isolated virtual networks for users. At a high level, a user creates a virtual network template by specifying values for various parameters related to how the user desires for the isolated virtual network to be configured in terms of connectivity to other networks (e.g., to indicate whether the user desires for resources in the virtual network to have connectivity to the public internet, to 5G networks, to an in-region virtual network, or any other type of network), in terms of security posture (e.g., based on defined security rules), and the like. In some embodiments, once a user has created a virtual network template at a cloud provider network, the user can launch resources into the virtual network by identifying the relevant template. The cloud provider network can then manage the creation of the relevant resources associated with provider substrate extension locations at which the instances are to be launched, as needed.

Figure 6:
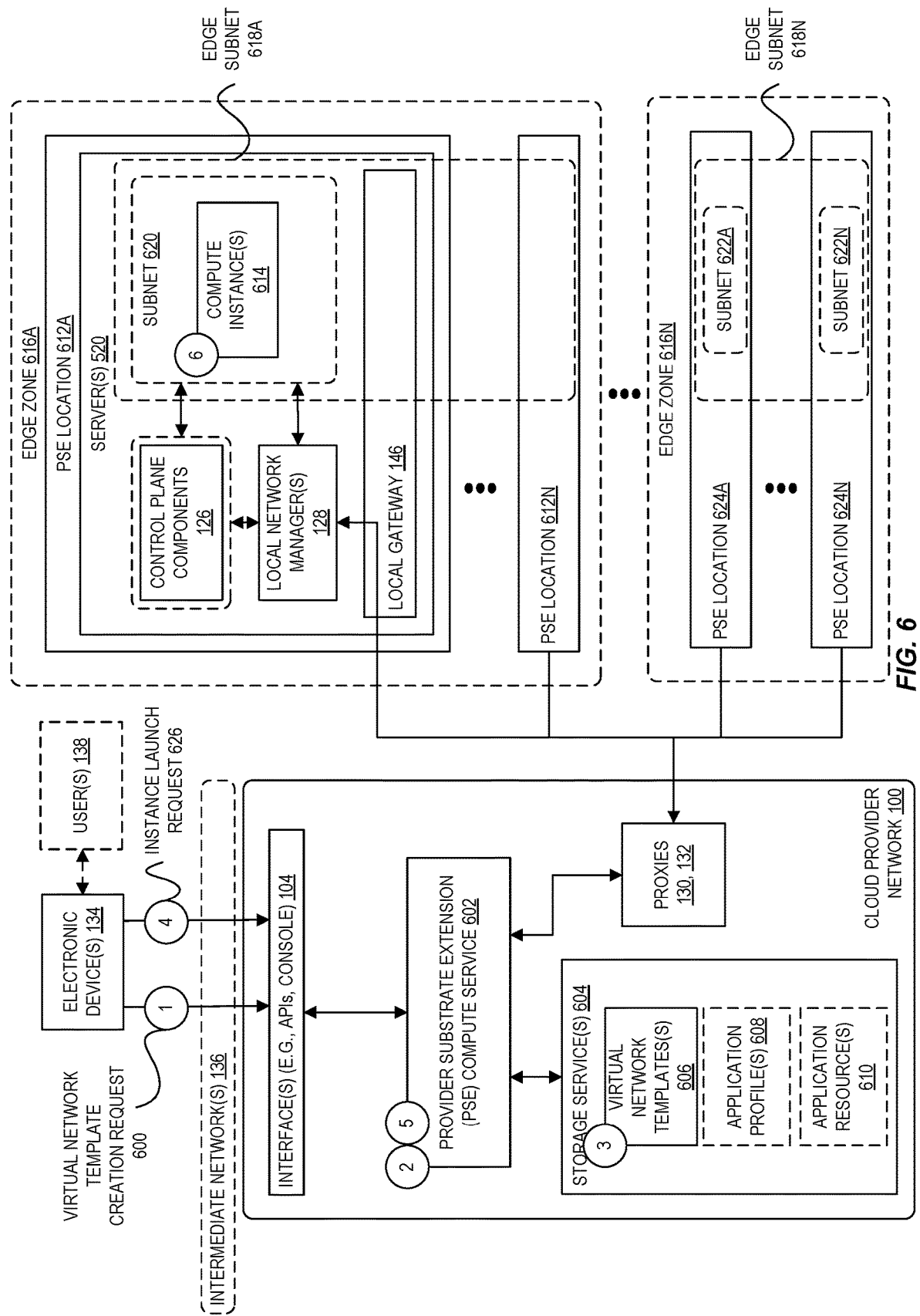
FIG. 6 is a diagram illustrating an environment in which users create virtual network templates used to logically group computing resources at one or more provider substrate extensions according to some embodiments.

FIG. 6 is a diagram illustrating an environment in which users create virtual network templates used to logically group computing resources at one or more provider substrate extensions according to some embodiments. In FIG. 6, the numbered circles "1"-"6" illustrate a process that includes a user creating a virtual network template for a virtual network into which the user desires to deploy computing resources at one or more provider substrate extension locations (e.g., a provider substrate extension location 612A), a user sending a request to launch one or more compute instances into the virtual network defined by the template, and the cloud service provider causing the configuration of various virtual network-related resources to launch the compute instances. The environment illustrated in FIG. 6 also shows the optional configuration of various edge subnets 618A-618N, each of which may span one or more provider substrate extension locations. As indicated above, in some embodiments, such edge subnets may be used as a logical representation of one or more respective underlying subnets associated with provider substrate extension locations (e.g., provider substrate extensions associated with a same edge zone). Although many examples described herein illustrate the creation and use of virtual network templates for resources deployed to provider substrate extensions, the described virtual network templates generally can be used to group resources deployed anywhere within a cloud provider network or extensions thereof. For example, a user may create a virtual network template to specify networking and security configurations for an isolated virtual network used to group resources deployed within a cloud provider network 100, within one or more provider substrate extensions, or combinations thereof.

At circle "1" in FIG. 6, a user generates a request 600 to create a virtual network template. As indicated above, communications between electronic device(s) 134 and the provider network 100, such as a request to create a virtual network template, can be routed through interface(s) 104, such as through use of application programming interface (API) calls, via a console implemented as a website or application, and so forth. In addition to serving as a frontend to control plane services, the interface(s) 104 can perform operations such as verifying the identity and permissions of the user initiating a request, evaluating the request and routing it to the appropriate control plane services, and the like. In some embodiments, at circle "2," a PSE compute service 602 processes the request 600 and, at circle "3," stores a resulting virtual network template in association with a user account generating the request (e.g., as a data object including the specified template parameter values and stored as part of virtual network templates 606 at a storage service 604 or other storage location). In some embodiments, the data object is stored in association with a user account that initiated the request. In other embodiments, the data object is stored in association with a separate user account (e.g., a "shadow" account) and the user account that initiated the request is granted read-only access to the data object associated with the separate user account. A shadow account may be an account owned by a service of the cloud provider network, where the shadow account holds resources that are accessible to the customer but not managed by the customer, and into which the customer may have limited visibility. A shadow account for edge location networks can be created on a per-customer basis. With respect to virtual networks, the usage of a shadow account can enable the customer to access edge locations without exposing the precise number and location of the edge locations. This can beneficially remove the burden of managing a large number of sites from the customer, and can also prevent customers of the cloud provider from gaining insight into the geographic layout of the CSP network infrastructure. In some embodiments, the PSE compute service 602 generally enables users to manage the deployment of compute instances to PSE locations 612A-612N, 624A-624N and, in some implementations, may be part of a hardware virtualization service of the provider network 100.

In some embodiments, a virtual network template creation request 600 can include an action name indicating that creation of a new virtual network template is desired (e.g., "csp edge create-virtual-network-template"), a parameter value indicating a "user-friendly" name for the virtual network template (e.g., "--template name my_vn_template"), and other possible parameters related to operation of the virtual network at provider substrate extensions 612A-612N, 624A-624N (which, in the example of FIG. 6, may or may not be associated with respective edge zones 616A, 616N).

In some embodiments, one parameter value that can be included in a virtual network template creation request 600 is a value indicating a CIDR range to use for the virtual network (e.g., IPv4/16, etc.). As indicated above, the specified CIDR range may be subdivided by the PSE compute service 602 for use within various automatically created subnets at provider substrate extension locations (e.g., subnet 620 associated with provider substrate extension location 612A, and subnets 622-622N associated with provider substrate extension locations 624A-624N). Other example parameter values that can be included in a virtual network template creation request 600 include values related to a routing posture of the virtual network (e.g., values used to define route table configurations, used to configure various types of gateways, etc.). Yet other example parameter values that can be included in a virtual network template creation request 600 include network NACL templates or other security rules used to define stateless firewall rules. Another example parameter value that can be included in a virtual network template creation request 600 includes identifiers of security group profiles used to configure network settings for relevant subnets.

The following is an example format for a request used to create a virtual network for computing resources to be deployed at provider substrate extension locations:

csp psec create-virtual-edge-network
--region east-1
--vn-id my_vn
--cidr-blocks 10.0.0.0/24
--zone east-1a-edge
(returns an virtual-edge-network-id that can be used for future API calls)

In some embodiments, upon a PSE compute service 602 receiving a virtual network template creation request 600, the service may configure some or all the configurations specified in the template relative to relevant provider substrate extensions (e.g., relative to provider substrate extensions that are part of an edge zone 616A or 616B identified in the template, or that satisfy other criteria in the template). For example, the PSE compute service 602 may proactively create subnets for provider substrate extension locations within the identified edge zones or locations specified in the template creation request, configure route tables, security groups, and other configurations at those locations, and so forth. In other embodiments, the corresponding resources may not be created and configured until a user requests the launch of a compute resource into the virtual network defined by the template, as described below, such that the underlying virtual network resources are created "just in time" relative to instance launch requests.

As indicated above, once a virtual network template has been defined by a user, users can launch compute instances and other resources into the virtual network by identifying the virtual network (e.g., based on a virtual network identifier returned by the request), and optionally further identifying an application profile for the instances to be launched (where an application profile may further identify application resource(s) 610 to be used to launch the instances). For example, at circle "4" in FIG. 6, a user might cause the generation of a workload launch request 626 to launch N number of instances based on an identified application profile into an identified virtual network associated with a virtual network template, where N may correspond to a number of instances to be launched satisfying the constraints of the application profile. In other embodiments, a user can cause generation of a request to launch N instances without specifying an application profile (e.g., "run-instances [--edge-network-id <value>]").

Similar to the virtual network template creation request 600 described above, communications between electronic device(s) 134 and the provider network 100, such as a request to launch one or more instances into a virtual network, can be routed through interface(s) 104, such as through use of application programming interface (API) calls, via a console implemented as a website or application, and so forth. In addition to serving as a frontend to control plane services, the interface(s) 104 can perform operations such as verifying the identity and permissions of the user initiating a request, evaluating the request and routing it to the appropriate control plane services, and the like.

In some embodiments, at circle "5," such launch requests are received by a PSE compute service 602, which may include several components (e.g., a placement manager, network manager, and storage manager, etc.) that are used to collectively identify one or more provider substrate extension locations within the virtual network at which compute instances can be launched to satisfy the parameters identified in an identified application profile or in request itself. The number of identified provider substrate extension locations may depend on a large number of constraints specified in an identified application profile as indicated above. Once identified, the PSE compute service 602 sends instructions to a local network manager 128 at a provider substrate extension location requesting the launch of the instances (e.g., compute instances 614, in addition to associated resources such as volume(s) or other resources). In some embodiments, at circle "6," the requested instances can then be launched at one or more servers 520 within the provider substrate extension and further associated with a subnet (e.g., compute instances 614 associated with a subnet 620 based on an assignment of an IP address in the subnet range to a virtual adapter associated with the instance).

As indicated above, in some embodiments, the launch of compute instances at one or more identified provider substrate extensions can include configuring various resources defined in a virtual network template as part of the instance launch. As one example, the PSE compute service 602 or other control plane components of the cloud provider network 100 may determine whether there is a subnet associated with a provider substrate extension location at which one or more compute instances are to be launched (e.g., as illustrated in FIG. 6, the PSE location 612A is associated with a subnet 620, whereas the PSE location 612N is not yet associated with a subnet). If the subnet 620 did not yet exist, the PSE compute service 602 or other control plane components creates the subnet according to the configurations specified in the associated virtual network template. The creation of the subnet, for example, may include the creation and storage of one or more objects representing the subnet to be stored in association with a corresponding user account. In the case that a subnet had not yet been created, the PSE compute service 602 may further cause the creation and configuration of similar resources corresponding to route tables (which may, for example, include sending instructions to configure a phantom router and various gateways associated the provider substrate extension, as described above, to configure routing to various types of networks), NACLs, security groups, and the like. Once such resources are created, the requested instances can be launched into the provider substrate extension location 612A, including the assignment of an IP address from the corresponding subnet range to a virtual network interface associated with the instance.

In some embodiments, the managed virtual network experience described above can include some user visibility into the subnets created on behalf of the user. For example, some other internal and external services of the cloud provider may rely on subnets to facilitate communication with customer applications and other resources and thus not be compatible with a completely abstracted virtual network. In some embodiments, to enable such applications and services to interact with subnets, the PSE compute service 602 may expose various APIs that expose either the individual subnets created at provider substrate extension locations or to abstracted edge subnets as described above.

As indicated above, an edge subnet or edge network (e.g., edge subnets 618A, 618N) is a virtual network control plane abstraction may translate into per-provider substrate extension subnets under the cover. These per-provider substrate extension subnets may or may not be visible to customers. In some embodiments, components of the cloud provider network 100 control plane—e.g., a network manager—is tasked with taking a network prefix associated with an edge network and dividing the prefix into smaller, per-provider substrate extension location prefixes.

In some embodiments, another technique for managing subnets at provider substrate extensions includes enabling users to define "routing groups." In some embodiments, a routing group is abstraction used to simplify managing virtual networks that span multiple provider substrate extensions. Instead of creating a subnet for a virtual network, users create a routing group and select which availability zones and edge zones the user desires their instances to span. For example, to deploy an application in a single availability zone and edge zone each on the east coast, a user can create a routing group that specifies "us-east-1a-edge" and "us-east-1a." A user can then assign one or more unused IPv4/6 prefixes from a virtual network to the routing group and can further add additional prefixes later, if needed. Similar to virtual network subnets, users can associate route tables and NACLs to a routing group to define the routing and security stance, respectively.

The following is an example format of a request used to create a routing group:
csp psec create-routing-group
--region us-east-1
--vn-id my_vn
--cidr-blocks 10.0.0/24,10.0.1/24
--ipv6-cidr-blocks 2001:db8:1234:1a01::/64
--zones us-east-1a,us-east-1a-edge
(returns a routing-group-id that can be used for future API calls)

The following is an example of a request used to launch a compute instance into a routing group:
csp psec run-instances
--region us-east-1
--image-id vmi-12345
--routing-group-id rg-123abc
--security-group-ids sg-abc123
--placement {
  carrier-codes={c1, c2, c3, all},
  latency={10-50,50-100,100-250,250-500,500+},
  locations={list_of_cities, list_of_states, list_of_provinces},
  strict=true,
}

As illustrated above, the use of routing groups enables options in the run-instances placement parameter. For example, these parameters may indicate locations at which the instance are to be placed either in terms of latency or geographic locations. Furthermore, users can select locations associated with particular communication service providers or indicate that all providers are satisfactory. In some embodiments, a strict flag can be used such that when the flag is set to true, the run instances API fails if the placement constraints cannot be satisfied but, if set to false, launches an instance that best-effort meets the specified constraints.

As indicated above, in some embodiments, gateways provide ways for instances to connect out of a virtual network. In some embodiments, each gateway represents a distinct connectivity option: an internet gateway provides connectivity to the public internet, egress-only internet gateways provide egress-only IPv6 connectivity to the public internet, etc. In some embodiments, provider substrate extensions associated with communication service provider locations further include a virtual network gateway referred to as a CSP gateway (CSP-GW) to represent connectivity to CSP networks. Similar to internet gateways, CSP-GWs perform 1:1 NAT between private IPv4 addresses and carrier-routable IPv4 addresses. CSP-GWs may also support a no-NAT option for both IPv4 and IPv6. Similar to egress-only internet gateways and private IPv6 subnets, users can use CSP-GWs to create private edge networks by allowing only outbound IPv6 connections. The following is an example format of a CSP gateway creation request:

csp psec create-csp-gateway
--vn-id vn-abc123
--options {
   "NAT":"enable"|"disable",
   "Ipv6EgressOnly":"enable"|"disable",
}

Users can direct traffic towards CSP-GWs by adding them as next hops for certain IPv4/6 prefixes in associated virtual network route tables. The following is an example request:

csp psec create-route
--route-table-id rt-abc123
--csp-gateway-id cspgw-abc123
--destination-cidr-block 0.0.0.0/0
[--destination-ipv6-cidr-block ::/0]

In some embodiments, CSP-GWs are related to, but distinct from other types of provider substrate extension local gateways. For example, such local gateways typically represent per-provider substrate extension gateways that connect virtual networks in the provider substrate extension to a user's private, local networks, whereas a CSP-GW may be more specific a communications service provider-associated provider substrate extension.

Figure 7:
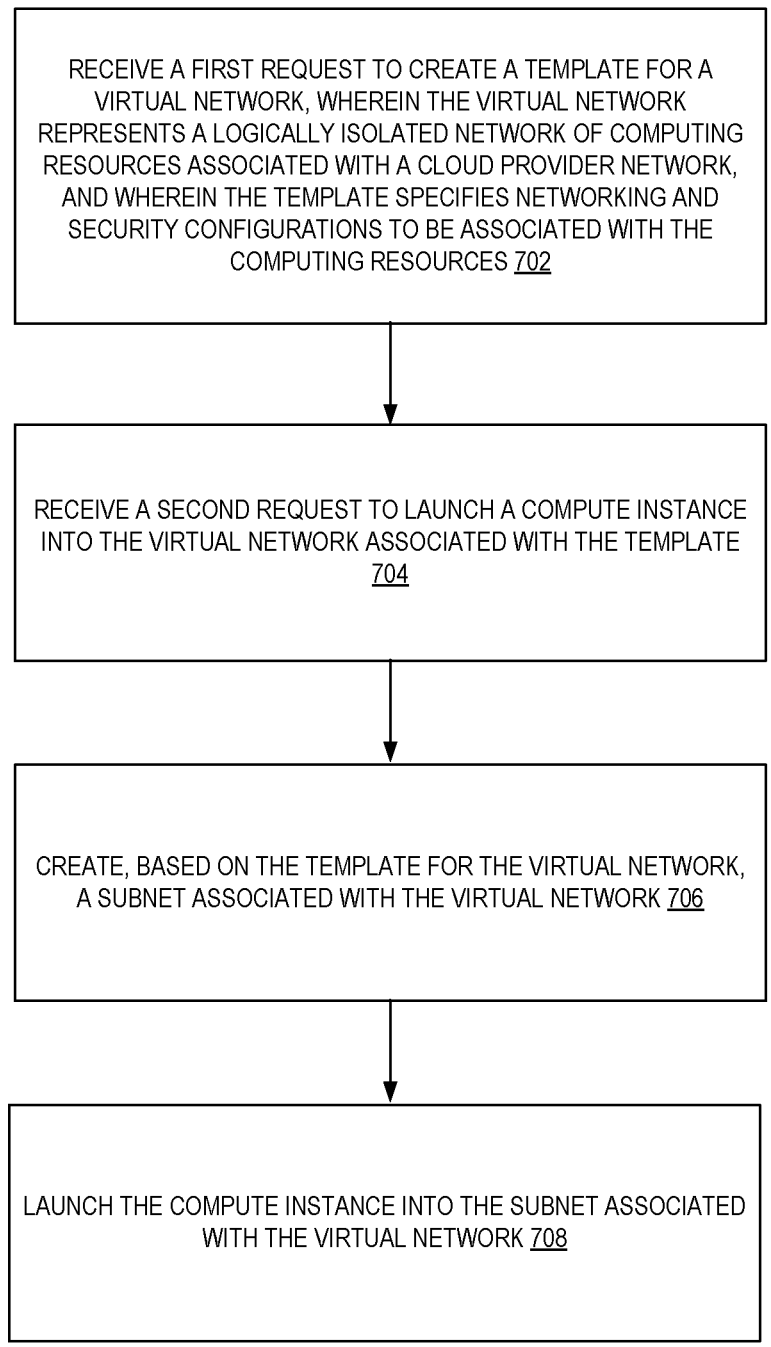
FIG. 7 is a flow diagram illustrating operations of a method for enabling users to define virtual network templates used to create virtual networks including computing resources at one or more provider substrate extensions according to some embodiments.

FIG. 7 is a flow diagram illustrating operations 700 of a method for enabling users to define virtual network templates used to create and configure a virtual network including computing resources at one or more provider substrate extensions according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by a PSE compute service 602 of the other figures.

The operations 700 include, at block 702, receiving a first request to create a template for a virtual network, wherein the virtual network represents a logically isolated network of computing resources to be deployed at one or more provider substrate extensions, and wherein the template specifies networking and security configurations to be associated with the computing resources at the one or more provider substrate extensions. In some embodiments, the first request is received by a control plane component of a cloud provider network that is separate from the provider substrate extension.

The operations 700 further include, at block 704, receiving a second request to launch a compute instance into the virtual network, the request identifying the template for the virtual network. In some embodiments, the request to launch the compute instance identifies an application profile, the application profile including configurations related to execution of compute instances at provider substrate extensions of a cloud provider network.

The operations 700 further include, at block 706, creating, based on the template for the virtual network, a subnet associated with a provider substrate extension at which the compute instance is to be launched. In some embodiments, the subnet is associated with a virtual subnet that spans a plurality of provider substrate extensions of a cloud provider network.

In some embodiments, the networking configurations include configurations related to routing of network traffic originating from the virtual network, and wherein the security settings include rules for inbound and outbound network traffic, and wherein the operations further include: configuring a route table associated with the subnet with the networking configurations, and configuring a virtual firewall associated with the subnet with the security settings. In some embodiments, the networking configurations include an indication of types of network to which computing resources in the virtual network are to have access, and wherein the method further comprises configuring one or more gateways associated with the virtual network based on the networking configurations The operations 700 further include, at block 708, launching the compute instance into the subnet associated with the provider substrate extension. In some embodiments, the provider substrate extension is connected to a private network of a communications service provider and is controlled at least in part by a control plane service of the cloud provider network via a connection through at least a portion of the private network. In some embodiments, the provider substrate extension includes one of: a network formed by servers located in a facility managed by a customer of the provider network, a network formed by servers located in a facility associated with a communications service provider, a network formed by servers located in a facility managed by a cloud provider and controlled at least in part by a separate control plane of the service provider network.

In some embodiments, the operations further include determining that a subnet associated with the virtual network does not exist at the provider substrate extension at which the compute instance is to be launched. In some embodiments, creating the subnet associated with the provider substrate extension at which the compute instance is to be launched is performed responsive to receiving the request to launch the compute instance into the virtual network. In some embodiments, the operations further include configuring, based on the template, a virtual network peering connection between the virtual network and a separate virtual network located within a cloud provider network.

Figure 8:
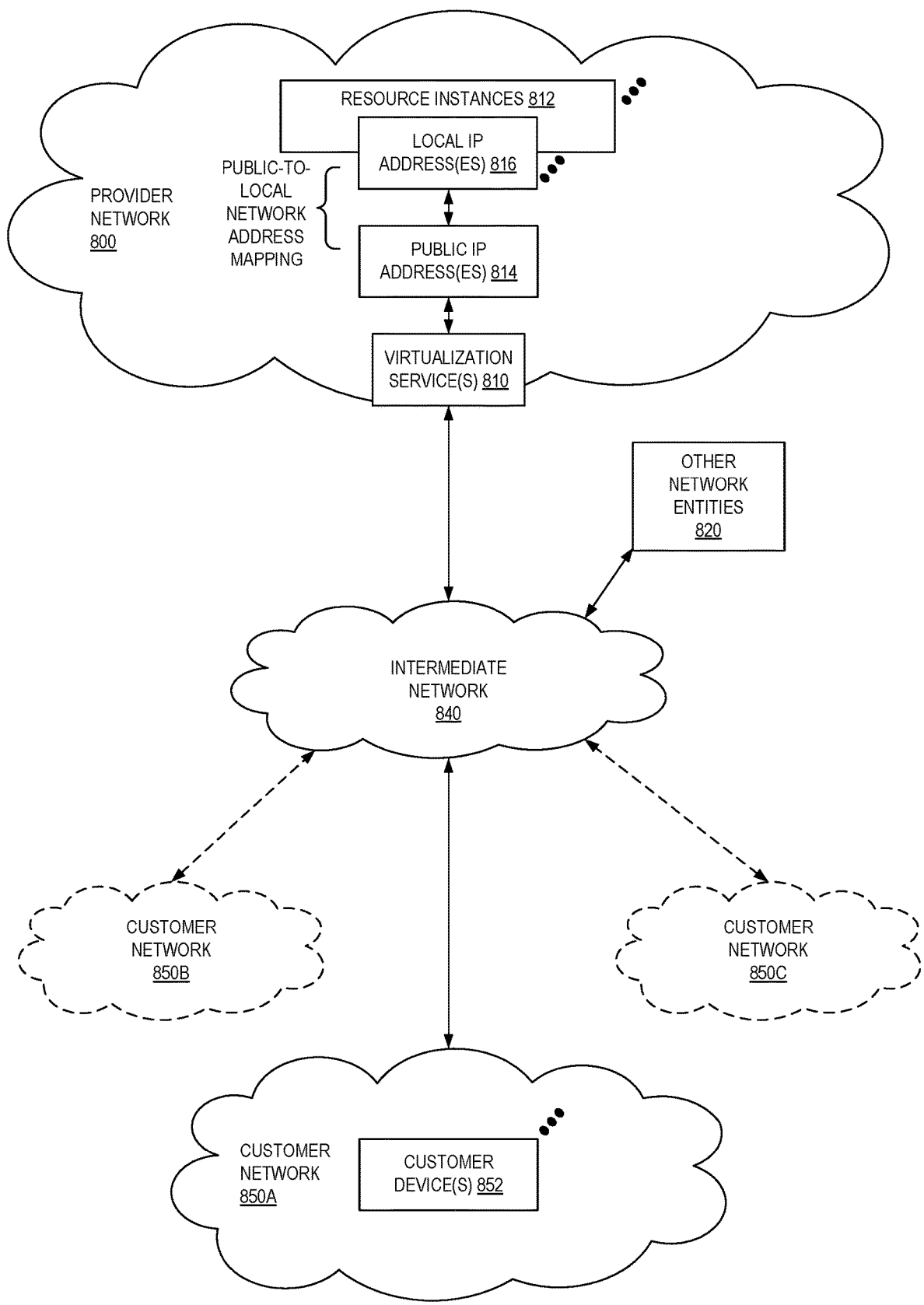
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
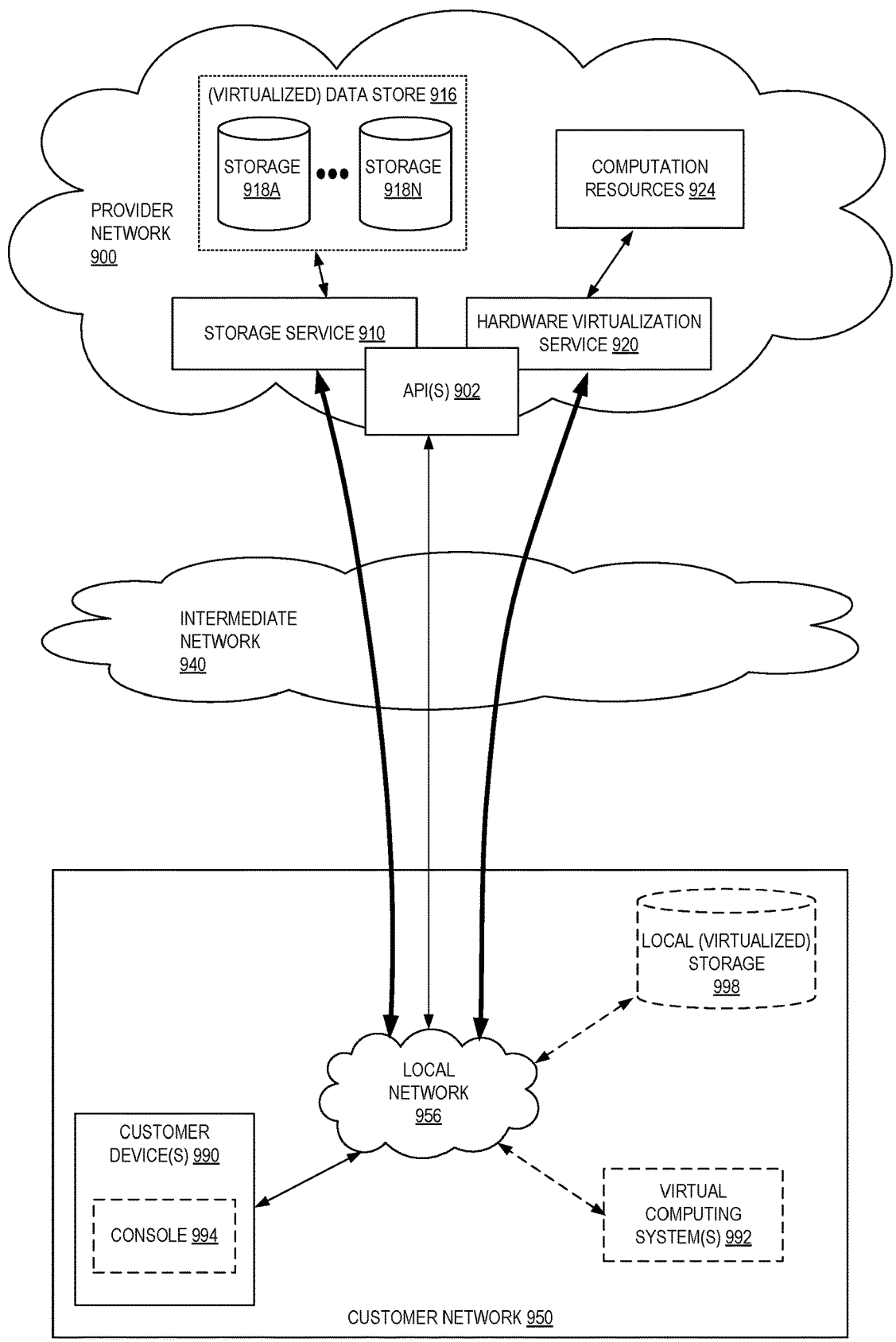
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
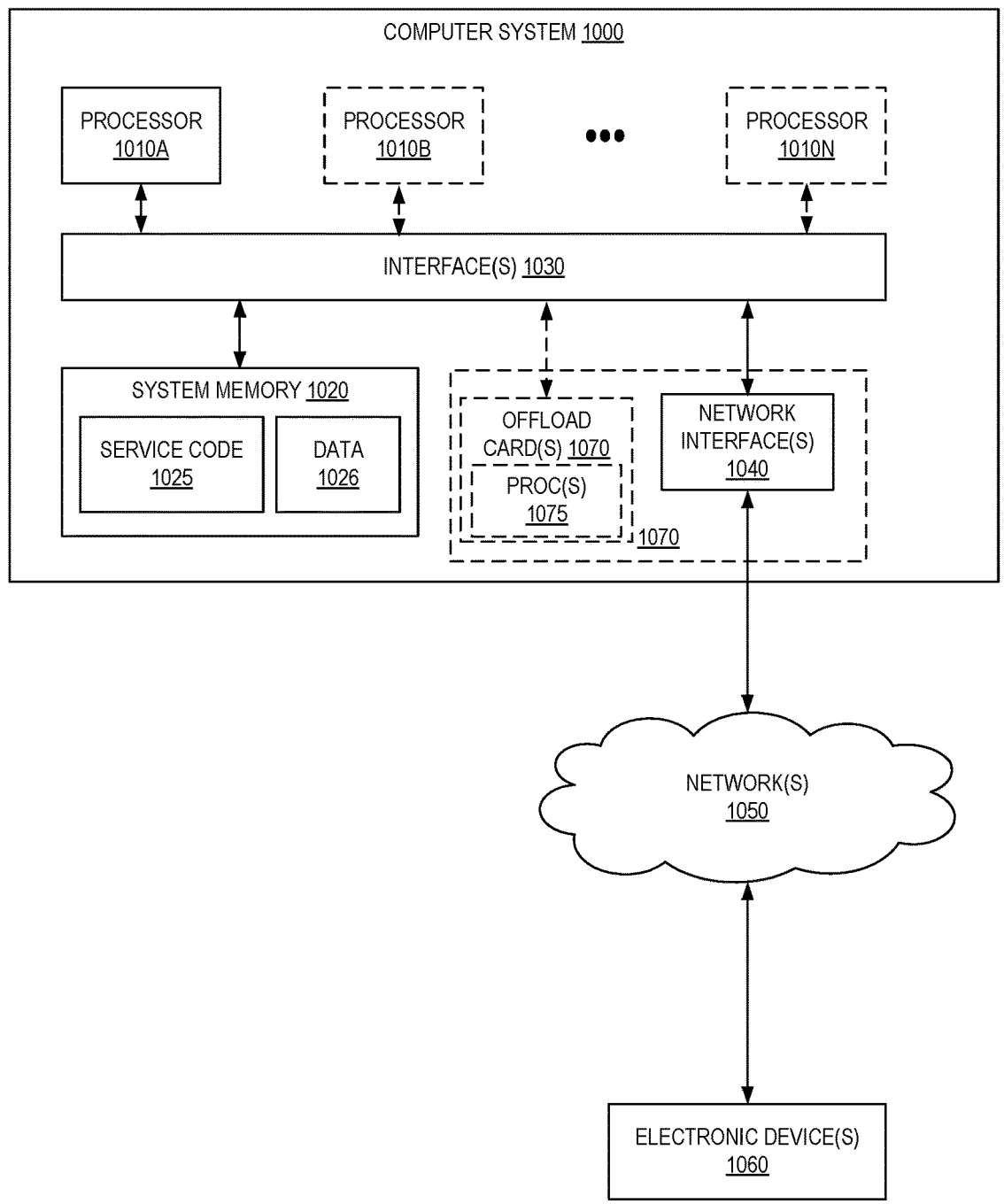
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as service code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, by a service of a cloud provider network, a first request to create a template for a virtual network, wherein the virtual network represents a logically isolated network of computing resources to be deployed at one or more provider substrate extensions of the cloud provider network, and wherein the template is stored as data specifying networking configurations and security configurations to be applied to network traffic associated with the computing resources at the one or more provider substrate extensions;
    receiving a second request to launch a compute instance into the virtual network associated with the template;
    creating, by the service and based on the template for the virtual network, a subnet associated with a provider substrate extension at which the compute instance is to be launched, wherein a provider substrate extension:
        includes a computer system that provides capacity for execution of customer compute instances, and
        is controlled at least in part by a control plane of the cloud provider network; and
    launching the compute instance into the subnet associated with the provider substrate extension.

2. The computer-implemented method of claim 1, wherein the networking configurations include configurations related to routing of network traffic originating from the virtual network, and wherein the security configurations include rules for inbound and outbound network traffic, and wherein the method further comprises:
    configuring a route table associated with the subnet with the networking configurations; and
    configuring a virtual firewall for the subnet with the security configurations.

3. The computer-implemented method of claim 1, wherein the second request to launch the compute instance identifies an application profile, the application profile including configurations related to execution of compute instances at provider substrate extensions of a cloud provider network, and wherein launching the compute instance into the subnet associated with the provider substrate extension is based at least in part on the application profile.

4. A computer-implemented method comprising:
    receiving, by a service of a cloud provider network, a first request to create a template for a virtual network, wherein the virtual network represents a logically isolated network of computing resources associated with a cloud provider network, and wherein the template is stored as data specifying networking configurations and security configurations to be associated with the computing resources;
    receiving a second request to launch a compute instance into the virtual network associated with the template, wherein the request identifies an application profile including parameters related to execution of a workload at provider substrate extensions of the cloud provider network;
    selecting, based on the application profile, a provider substrate extension at which to launch cloud instance;
    creating, by the service and based on the template for the virtual network, a subnet associated with a provider substrate extension of the cloud provider network; and
    launching the compute instance into the subnet associated with the provider substrate extension of the cloud provider network.

5. The computer-implemented method of claim 4, wherein the networking configurations include configurations related to routing of network traffic originating from the virtual network, and wherein the security configurations include rules for inbound and outbound network traffic, and wherein the method further comprises:
    configuring a route table associated with the subnet with the networking configurations; and
    configuring a virtual firewall associated with the subnet with the security configurations.

6. The computer-implemented method of claim 4, wherein parameters related to execution of the workload at provider substrate extensions of the cloud provider network include a latency constraint.

7. The computer-implemented method of claim 4, wherein the subnet is associated with a virtual subnet that spans a plurality of provider substrate extensions of a cloud provider network.

8. The computer-implemented method of claim 4, wherein the networking configurations include an indication of types of network to which computing resources in the virtual network are to have access, and wherein the method further comprises configuring one or more gateways associated with the virtual network based on the networking configurations.

9. The computer-implemented method of claim 4, wherein the first request is received by a control plane component of the cloud provider network that is separate from the provider substrate extension of the cloud provider network at which the compute instance is launched.

10. The computer-implemented method of claim 4, wherein the provider substrate extension is connected to a network of a communications service provider and is controlled at least in part by a control plane service of the cloud provider network via a connection through at least a portion of the network.

11. The computer-implemented method of claim 4, wherein creating the subnet is performed responsive to receiving the request to launch the compute instance into the virtual network.

12. The computer-implemented method of claim 4, further comprising determining that a subnet does not exist at the provider substrate extension at which the compute instance is to be launched.

13. The computer-implemented method of claim 4, further comprising configuring, based on the template, a virtual network peering connection between the virtual network and a separate virtual network located within a cloud provider network.

14. The computer-implemented method of claim 4, wherein the provider substrate extension includes one of: a network formed by servers located in a facility managed by a customer of a cloud provider network, a network formed by servers located in a facility associated with a communications service provider, a network formed by servers located in a facility managed by a cloud provider and controlled at least in part by a separate control plane of a cloud provider network.

15. The computer-implemented method of claim 4, further comprising storing data representing the virtual network in association with a separate user account of the cloud provider network, wherein a user account associated with the first request has read only access to the data representing the virtual network.

16. A system comprising:
- a provider substrate extension compute service implemented by a first one or more electronic devices, the provider substrate extension compute service including instructions that upon execution cause the provider substrate extension compute service to:
  - receive a first request to create a template for a virtual network, wherein the virtual network represents a logically isolated network of computing resources to be deployed at one or more provider substrate extensions, and wherein the template is stored as data specifying networking configurations and security configurations to be associated with the computing resources at the one or more provider substrate extensions,
  - receive a second request to launch a compute instance into the virtual network associated with the template,
  - create, by the provider substrate extension compute service and based on the template for the virtual network, a subnet associated with a provider substrate extension at which the compute instance is to be launched, and
  - send instructions to the provider substrate extension to launch the compute instance into the subnet; and
- a provider substrate extension implemented by a second one or more electronic devices, the provider substrate extension including instructions that upon execution cause the provider substrate extension to:
  - receive the instructions to launch the compute instance into the subnet, and
  - launch the compute instance into the subnet.

17. The system of claim 16, wherein the networking configurations include configurations related to routing of network traffic originating from the virtual network, and wherein the security configurations include rules for inbound and outbound network traffic, and wherein the instructions further cause the provider substrate extension compute service to:
- configure a route table associated with the subnet with the networking configurations; and
- configure a virtual firewall associated with the subnet with the security configurations.

18. The system of claim 16, wherein the request to launch the compute instance identifies an application profile, the application profile including configurations related to execution of compute instances at provider substrate extensions of a cloud provider network.

19. The system of claim 16, wherein the subnet is associated with a virtual subnet spanning a plurality of provider substrate extensions of a cloud provider network.

20. The system of claim 16, wherein the networking configurations include an indication of types of network to which resources in the virtual network are to have access, and wherein the instructions further cause the provider substrate extension compute service to configure a route table associated with the subnet with the networking configurations.

21. A computer-implemented method comprising:
- creating, by a component of a cloud provider network, a virtual network spanning a plurality of edge locations of the cloud provider network;
- maintaining the virtual network in a shadow account that allows a customer to launch virtual resources into the virtual network without exposing a number or location of the plurality of edge locations to the customer;
- receiving a request from the customer to launch an application the virtual network, the request specifying at least parameters of the application and constraints on latency for end user access to the application;
- identifying a particular configuration of the virtual resources to use for running the application based on the parameters specified in the request;
- identifying a particular edge location of the plurality of edge locations at which to launch the particular configuration of the virtual resources based on the constraints on latency; and
- launching the application by provisioning the particular configuration of the virtual resources in the particular edge location.

* * * * *